United States Patent
Rondinelli et al.

(10) Patent No.: US 7,139,440 B2
(45) Date of Patent: Nov. 21, 2006

(54) METHOD AND APPARATUS FOR ENCODING PHOTOGRAPHIC IMAGES

(75) Inventors: Michael Rondinelli, Bethel Park, PA (US); Herman Herman, Pittsburgh, PA (US)

(73) Assignee: EyeSee360, Inc., Pittsburgh, PA (US)

( * ) Notice: Subject to any disclaimer, the term of this patent is extended or adjusted under 35 U.S.C. 154(b) by 690 days.

(21) Appl. No.: 10/227,136

(22) Filed: Aug. 23, 2002

(65) Prior Publication Data

US 2003/0039395 A1    Feb. 27, 2003

Related U.S. Application Data

(60) Provisional application No. 60/314,940, filed on Aug. 25, 2001.

(51) Int. Cl.
*G06K 9/32* (2006.01)

(52) U.S. Cl. .................... 382/293; 345/619

(58) Field of Classification Search ............... 382/232, 382/276, 293; 345/418–427, 619, 646–648; 348/36–39
See application file for complete search history.

(56) References Cited

U.S. PATENT DOCUMENTS

| | | |
|---|---|---|
| 4,757,383 A | 7/1988 | Tanaka |
| 4,797,944 A | 1/1989 | Tanaka |
| 4,805,030 A | 2/1989 | Tanaka |
| 4,807,042 A | 2/1989 | Tanaka |
| 5,021,879 A * | 6/1991 | Vogel ................ 348/402.1 |
| 5,067,019 A | 11/1991 | Juday et al. |
| 6,043,837 A | 3/2000 | Driscoll, Jr. et al. |
| 6,072,536 A * | 6/2000 | Beacken et al. ........ 348/584 |
| 6,157,385 A | 12/2000 | Oxaal |
| 6,211,864 B1 | 4/2001 | Redford |
| 6,219,089 B1 | 4/2001 | Driscoll, Jr. et al. |
| 6,331,869 B1 * | 12/2001 | Furlan et al. ............ 348/36 |
| 6,337,708 B1 | 1/2002 | Furlan et al. |
| 6,369,818 B1 | 4/2002 | Hoffman et al. |
| 6,608,933 B1 * | 8/2003 | Dowell et al. .......... 382/232 |
| 2002/0064306 A1 | 5/2002 | Pilz |

FOREIGN PATENT DOCUMENTS

| | | |
|---|---|---|
| EP | 0695085 A1 | 1/1996 |
| WO | WO 00/08889 | 2/2000 |

OTHER PUBLICATIONS

S. L. Bogner, "An Introduction To Panospheric Imaging", *IEEE*, pp. 3099-3106 (Oct. 1995).

* cited by examiner

*Primary Examiner*—Jingge Wu
*Assistant Examiner*—Yubin Hung
(74) *Attorney, Agent, or Firm*—Alan G. Towner, Esq.; Pietragallo, Bosick & Gordon LLP

(57) ABSTRACT

A method of encoding images comprising the steps of retrieving a source image file including pixel data, transforming the source image file pixel data into a destination data set of pixel data representative of a modified partial equi-rectangular projection, and outputting the pixel data from the destination data set as a destination image file. The source image file can include an annular source image file. An apparatus for encoding images in accordance with the method is also provided.

29 Claims, 12 Drawing Sheets

METHOD AND APPARATUS FOR ENCODING PHOTOGRAPHIC IMAGES

CROSS-REFERENCE TO RELATED APPLICATION

This application claims the benefit of U.S. Provisional Patent Application Ser. No. 60/314,940 filed Aug. 25, 2001.

FIELD OF THE INVENTION

The present invention relates to methods and apparatus for encoding photographic images, and more particularly relates to methods and apparatus for making the images more suitable for transmitting over a computer network and/or storing on a computer system.

BACKGROUND INFORMATION

Recent work has shown the benefits of panoramic imaging, which is able to capture a large azimuth view with a significant elevation angle. If instead of providing a small conic section of a view, a camera could capture an entire half-sphere at once, several advantages could be realized. Specifically, if the entire environment is visible at the same time, it is not necessary to move the camera to fixate on an object of interest or to perform exploratory camera movements.

Some panoramic camera systems capture light from all directions (i.e., 360 degrees in a given plane), either as still images or as a continuous video stream. The images from such a device can be geometrically transformed to synthesize a conventional camera view in any direction. One method for constructing such panoramic camera systems combines a curved mirror and an imaging device, such as a still camera or a video camera. The mirror gathers light from all directions and redirects it to the camera. Other methods for constructing such panoramic camera systems include combining one or more wide-angle lenses with a still camera or a video camera, or combining a hybrid mix of lenses and mirrors with a still camera or a video camera.

Often times it is desirable to deliver still images or video from such a panoramic camera system electronically over the Internet or other computer network, or by conventional television broadcast means, including HDTV Current techniques are limiting due to high demands for bandwidth over a computer network or storage on a computer disk, and some sources are not suitable for transmitting/storing by conventional television broadcast methods. This holds especially true for panoramic video data, which requires an extremely large amount of bandwidth and storage resources to transmit and store the many still images that make up the video feed, and to display the images at a suitable video rate. Further, it is challenging to decode still image and video data and transform it into a form suitable for viewing, such as a perspective-corrected image. Thus, there is a need for a method and apparatus that can make such images more suitable for transmitting over a computer network and/or storing on a computer system.

The present invention has been developed in view of the foregoing, and to address other deficiencies of the prior art.

SUMMARY OF THE INVENTION

This invention provides a method of encoding wide angle or panoramic images. The method comprises the steps of retrieving a source image file including pixel data, transforming the source image file pixel data into a destination data set of pixel data representative of a modified partial equi-rectangular projection, and outputting the pixel data from the destination data set as a destination image file.

The source image file can comprise an annular source image file.

The step of transforming the source image file pixel data into a destination data set of pixel data can comprise the step of arranging the destination data set of pixel data such that a compression artifact source will occur on a perimeter of at least one macro-block of pixel data.

The step of arranging the destination data set of pixel data can include the step of dividing the source image file pixel data into equi-rectangular blocks of pixels having a width substantially equal to a width of the at least one macro-block of pixel data and a length substantially equal to an integer multiple of a length of the at least one macro-block of pixel data.

The step of transforming the source image file pixel data into the destination data set of pixel data can comprise the step of arranging the destination data set of pixel data into a form that may be efficiently accessed by a data storage device.

The destination data set of pixel data can be arranged to include equi-rectangular blocks of pixels having a width substantially equal to a width of a macro-block of pixel data and a length substantially equal to an integer multiple of a length of a macro-block of pixel data.

The destination data set of pixel data can be arranged in one of: a linear increasing phi major pattern, an alternating sectors pattern, and a random pattern.

The method can further comprise the steps of creating a data table containing pixel attribute data corresponding to source image pixel data, and storing the data table with the destination data set of pixel data as the destination image file.

The step of transforming the source image file pixel data into a destination data set of pixel data representative of a modified partial equi-rectangular projection can comprise the steps of transforming the source image file pixel data into a first data set of pixel data representative of an ortho-annular projection, and transforming the pixel data from the first data set into a second data set of pixel data representative of the partial equi-rectangular projection.

The step of transforming the source image file pixel data into the first data set of pixel data can comprise the steps of dividing the pixel data of the annular source image file into a plurality of wedge shaped sectors, and converting each wedge shaped sector to a triangle shaped sector.

The pixel data of the annular source image file can be further divided into a plurality of substantially concentric bands each having a width substantially equal to a width of a macro-block of pixel data. Each wedge shaped sector can be converted to a triangle shaped sector by transforming an arced side of the wedge shaped sector into a substantially straight line segment. The length of the arced side can be substantially equal to the length of the line segment.

The ortho-annular projection can be substantially in the shape of one of: a square or a rectangle.

The method can further comprise the step of adding border pixel data to the source image file.

In another aspect, the invention encompasses an apparatus for encoding images, the apparatus comprising means for receiving a source image file including pixel data, and a processor for transforming the source image file pixel data into a destination data set of pixel data representative of a modified partial equi-rectangular projection, and outputting the pixel data from the destination data set as a destination image file.

The processor can further serve as means for arranging the source image file pixel data such that a compression artifact source will occur on a perimeter of at least one macro-block of pixel data.

In addition, the processor can further serve as a means for dividing the source image file pixel data into equi-rectangular blocks of pixels having a width substantially equal to a width of the at least one macro-block of pixel data and a length substantially equal to an integer multiple of a length of the at least one macro-block of pixel data.

Also, the processor can further serve as means for arranging the destination data set of pixel data such that the destination data set of pixel data may be efficiently accessed in a data storage device.

The destination data set of pixel data can be arranged to include equi-rectangular blocks of pixels having a width substantially equal to a width of a macro-block of pixel data and a length substantially equal to an integer multiple of a length of a macro-block of pixel data.

The destination data set of pixel data can be arranged in one of: a linear increasing phi major pattern, an alternating sectors pattern, or a random pattern.

The processor can further serve as means for dividing the source image file pixel data into a plurality of wedge shaped sectors, and converting each wedge shaped sector to a triangle shaped sector.

The source image file pixel data can be further divided into a plurality of substantially concentric bands each having a width substantially equal to a width of a macro-block of pixel data. Each wedge shaped sector can be converted to a triangle shaped sector by transforming an arced side of the wedge shaped sector into a substantially straight line segment. The length of the arced side can be substantially equal to the length of the line segment.

The processor can further serve as means for creating a data table containing pixel attribute data corresponding to the source image file pixel data and storing the data table in the destination image file.

The processor can further serve as means for transforming the source image file pixel data into a first data set of pixel data representative of an ortho-annular projection, transforming the pixel data from the first data set into a second data set of pixel data representative of the partial equi-rectangular projection.

The ortho-annular projection can be in the shape of one of: a square or a rectangle.

The source image file can include border pixel data.

DETAILED DESCRIPTION OF THE INVENTION

Figure 1:
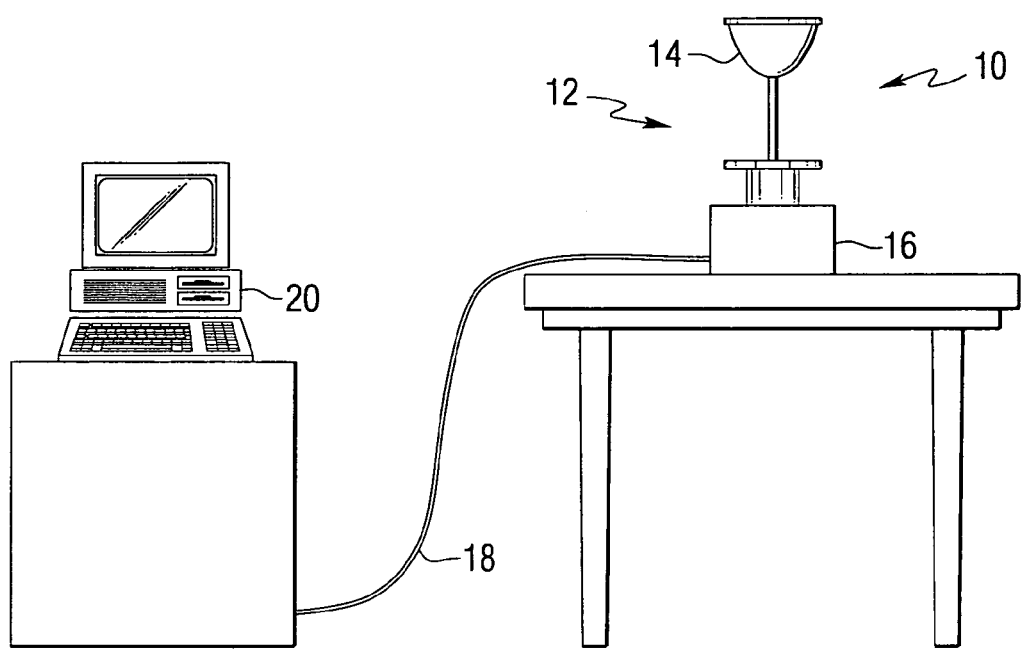
FIG. 1 is a schematic representation of a system for producing panoramic images that can utilize the invention, in accordance with an embodiment of the present invention.

The present invention provides a method and apparatus for encoding images represented in electronic form. Referring to the drawings, FIG. 1 is a schematic representation of a system 10 for producing panoramic images that can utilize the invention. The system includes a panoramic imaging device 12, such as a panoramic camera. The panoramic imaging device 12 may include an equiangular mirror 14 and a camera 16 that cooperate to produce an image in the form of a 2-dimensional array of pixels. For the purposes of this invention, the pixels are considered to be an abstract data type to allow for the large variety of color models, color codings, and bit depths. Each pixel can be represented as a data word, for example, a pixel can be a 32-bit value consisting of four 8-bit channels representing alpha, red, green and blue information. The image data can be transferred, for example by way of a cable 18 or wireless link, to a computer 20 for processing. Alternatively, the image data can be transferred over the Internet or other computer network to a computer 20 or other processing means for processing. In one embodiment, the image data may be transferred to a server computer for processing in a client-server computer network, as disclosed in copending commonly owned U.S. patent application Ser. No. 10/081,433 filed Feb. 22, 2002, which is hereby incorporated by reference. Such processing may include, for example, converting the raw 2-dimensional array of pixels captured with the panoramic imaging device into an image suitable for viewing.

The method of the invention may be performed using a software application that can be used on various types of computers, such as Mac OS 9, Mac OS X, and Windows platforms. Alternatively, the method of the invention may be performed using hardware of a computer system, or may be performed using a combination of hardware and software temporarily or permanently embedded in a computer system. The invention is particularly applicable to encoding panoramic images created using panoramic optic camera systems, such as the panoramic imaging device 12. The software can encode images shot with a panoramic optic system and produce images suitable for transmitting over a computer network and/or storing on a computer system.

Figure 2:
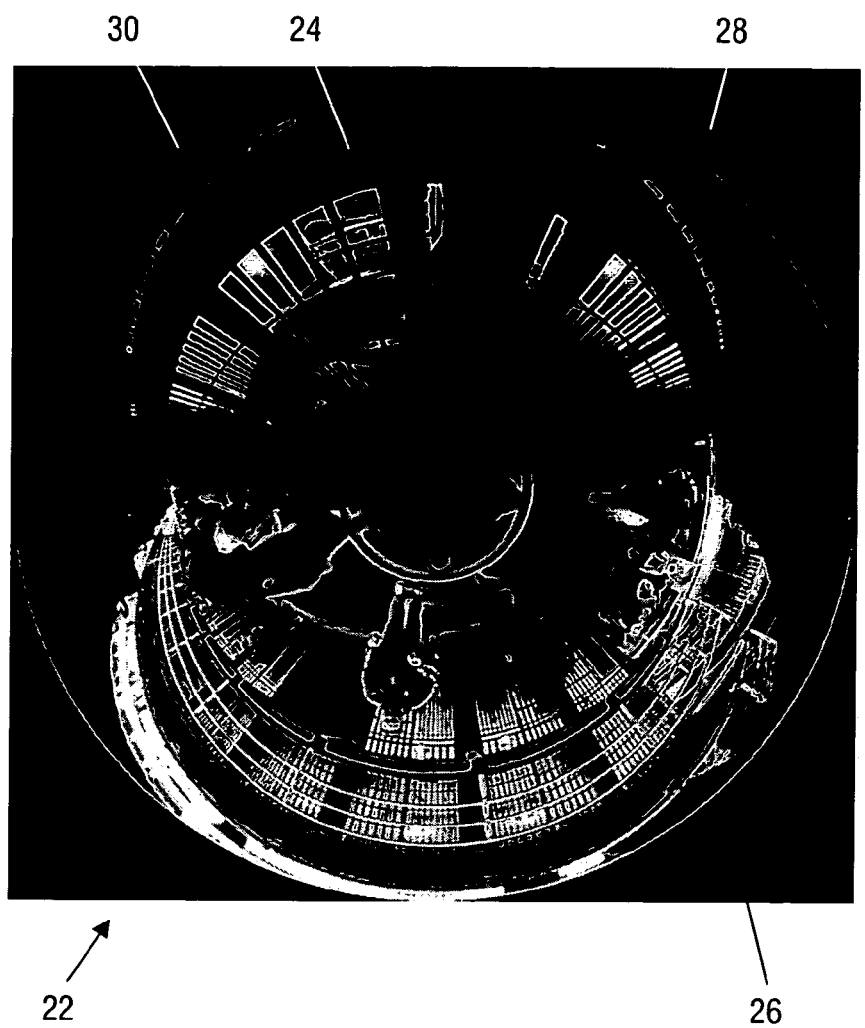
FIG. 2 is a raw panoramic image captured with a system for producing panoramic images in accordance with an embodiment of the present invention.

FIG. 2 shows a raw panoramic image 22 captured with a panoramic optic system, such as the system 10 shown in FIG. 1. The raw panoramic image 22 shown in FIG. 2 includes an annular projection 24 of the image data captured with the panoramic optic system, wherein a polar coordinate system may be used to locate points on the image. Raw panoramic images are often presented in an annular format, however, raw panoramic images may be represented with other projections, such as a spherical projection, and such projections are within the scope of the present invention. In FIG. 2, the annular projection 24 is shown within a rectangular image frame 26 of a standard camera. As shown in FIG. 2, the annular projection 24 of the image data takes up only a small portion of the rectangular image frame 26, and a large amount of unused space 28 is created. This unused or wasted space will still be stored and transmitted along with the image data, consuming valuable bandwidth and storage space. Another potential problem of representing a raw panoramic image 22 as an annular projection 24 in a rectangular image frame 26 is that a boundary 30 between the annular projection of the image and the unused space 28 may cross individual pixels and act as a compression artifact source if the image data is compressed using a compression algorithm. As used herein, the term "compression artifact source" refers to a line, boundary, or other portion of an uncompressed image that crosses over at least one individual pixel of the image and may cause visible distortions in the image when the image is compressed and then later uncompressed for viewing.

Figure 3:
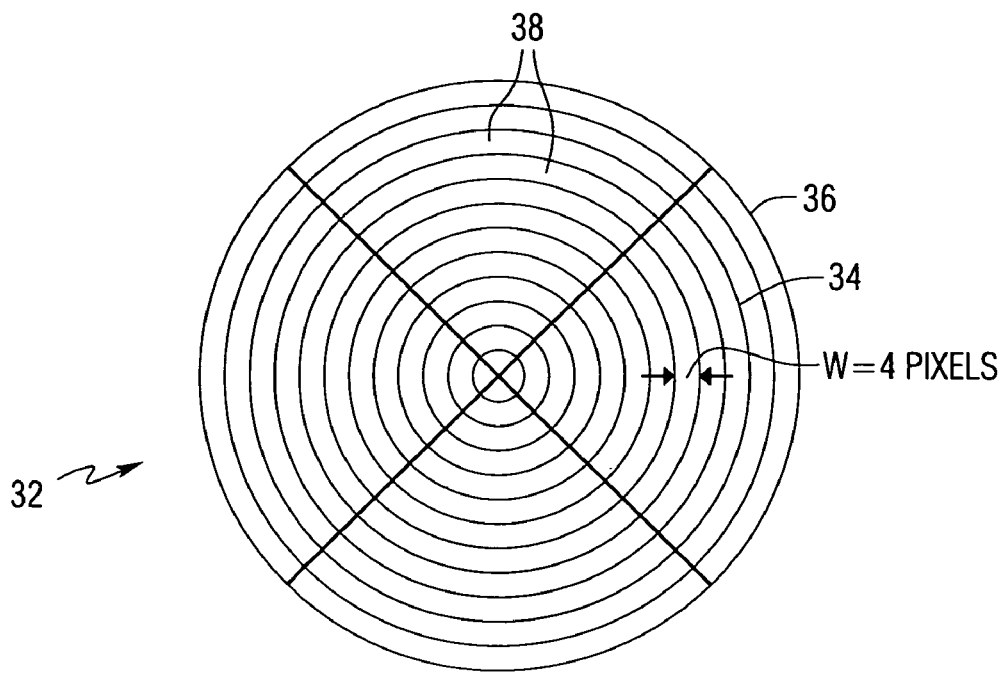
FIG. 3 is a schematic representation of a raw annular panoramic image in accordance with an embodiment of the present invention.
Figure 4:
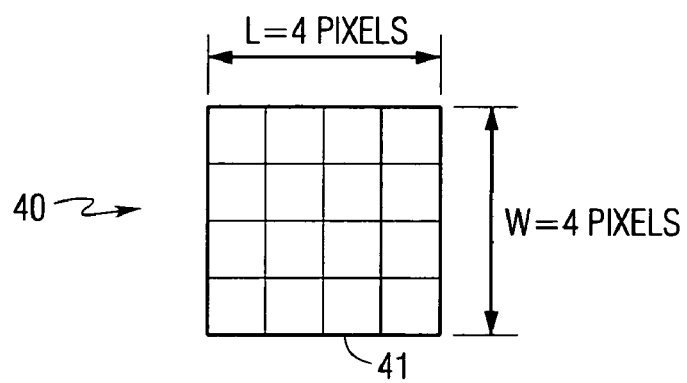
FIG. 4 illustrates a macro-block of pixel data in accordance with an embodiment of the present invention.

In one embodiment, the method of the present invention may depict an annular projection of a raw panoramic image in a rectangular frame by transforming the pixel data of the annular projection into a data set of pixel data representative of an ortho-annular projection. As used herein, the term "ortho-annular image" refers to a modification of an annular image projection where all the pixels corresponding to the same elevation on an arc of the original annular image occur along a straight line. FIG. 3 is a schematic representation of a raw annular panoramic image 32, which may be referred to as a source image. As shown in FIG. 3, the annular panoramic image 32 may be divided into a plurality of wedge shaped sectors, such as wedge shaped sector 34. In one embodiment the annular image may be divided into four wedge shaped sectors, however, more or less sectors may be used. As shown in FIG. 3, each wedge shaped sector has at least one arced side, such as arced side 36. The annular panoramic image 32 may also be divided into a plurality of substantially concentric bands 38, and each concentric band may have a width w that is substantially equal to a width w of a macro-block of pixels. As used herein, the term "macro-block" refers to a group or block of pixels, wherein the macro-block has a width w that may be measured in pixels and a length 1 that may be measured in pixels. FIG. 4 shows an example of a macro-block 40 of pixels having a width w of 4 pixels, a length 1 of 4 pixels, and a perimeter 41. Macro-blocks may include any number of pixels, though for the purpose of this invention they are ideally an integer multiple of the macro-block size used by the compression algorithm. Furthermore, the size of a macro-block may be related to the size of the memory cache being used to optimize the throughput of pixel data in a computer system.

Modern computer processors utilize one or more cache memory buffers to improve access time to frequently used data. Several conventions are used for these cache buffers, all have a limited "row length" of a contiguous number of bytes that each cache entry represents. The size of the macro-blocks used should ideally be a multiple of this row length to optimize cache performance of the system. Further, it is desirable to have locality of reference to improve throughput, which means that blocks of memory used at approximately the same time should be near one another. This increases the likelihood that memory to be used already resides in the (fast) cache, rather than the slower main memory.

Figure 5:
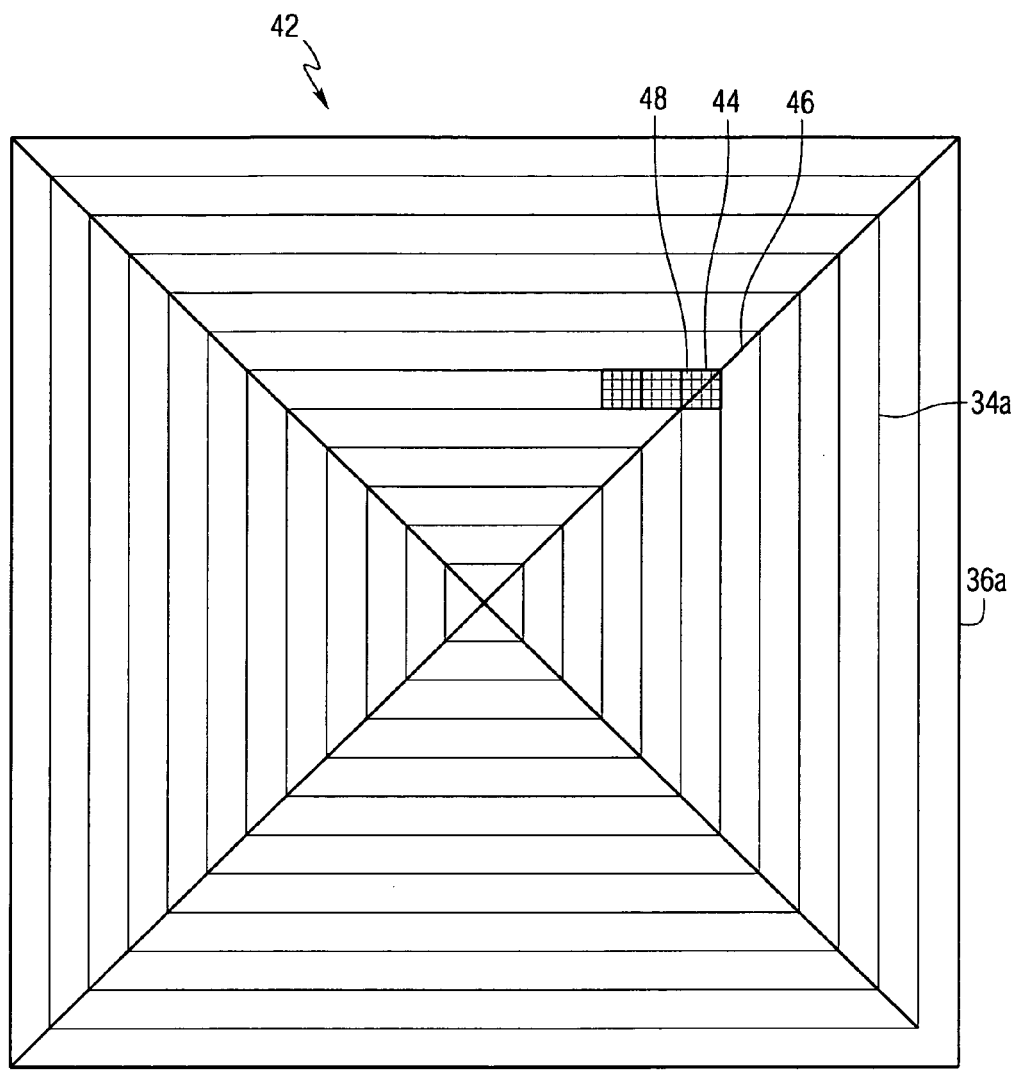
FIG. 5 is a schematic representation of an ortho-annular image in accordance with an embodiment of the present invention.

In order to depict the annular panoramic image 32 of FIG. 3 in a rectangular frame, it may be converted to the substantially square ortho-annular projection 42 shown in FIG. 5. The annular panoramic image 32 may be converted to the ortho-annular projection 42 by converting each of the wedge shaped sectors, such as wedge shaped sector 34, to the triangle shaped sectors shown in FIG. 5, such as triangle shaped sector 34a. Each of the wedge shaped sectors may be converted to the triangle shaped sectors by transforming each arced side of the wedge shaped sector, such as the arced side 36, to a substantially straight line segment of the triangle shaped sector, such as the straight line segment 36a. In one embodiment, in order to ensure that the same level of detail will be present in the ortho-annular projection 42 as is present in the annular panoramic image 32, the length of the substantially straight line segment of each triangle shaped sector, such as the straight line segment 36a, may be made substantially equal to the length of the arced side of each wedge shaped sector, such as the arced side 36. In another embodiment, the resulting ortho-annular projection 42 may be formed as a rectangle, in order to match a particular aspect ratio of an image when it is presented to a user in a viewable format.

As depicted in FIGS. 3 and 5, converting the annular panoramic image 32 to the ortho-annular projection 42 eliminates the problem of wasted data space by filling the entire square or rectangular image frame of a standard camera with usable image data. The ortho-annular projection 42 may also be easier to store as a whole in a computer memory or other computer storage device, and may simplify the task of locating pixels in the image by avoiding the need to utilize floating point arithmetic. However, having four different coordinate systems to represent each of the four triangle shaped sectors makes the process of producing a viewable image from the ortho-annular projection 42 more complex. Additionally, if the image is being transmitted to another processor for processing, it may be desirable to apply a compression algorithm to the pixel data in order to reduce the size of the image file to provide a faster and more efficient transmission.

If a compression algorithm is used to compress the ortho-annular projection 42 of FIG. 5, the sharp lines defining the edges of the triangle shaped sectors may act as compression artifact sources and may cause the resulting viewable image to include distortions when it is uncompressed. This results from a tendency of compression algorithms to filter high frequency signals in the image, which sharp edges produce. This is illustrated in FIG. 5, where four macro-blocks are shown, such as macro-block 44. FIG. 5 shows that sharp line 46 defining an edge of the triangle shaped sector 34a runs through macro-block 44, and actually intersects the individual pixels 48 of macro-block 44. If the ortho-annular projection 42 is compressed to provide a more efficient transmission of the image, and is later uncompressed for viewing, the pixels intersected by the sharp line 46 may appear visibly distorted in the uncompressed viewable image.

Figure 6:
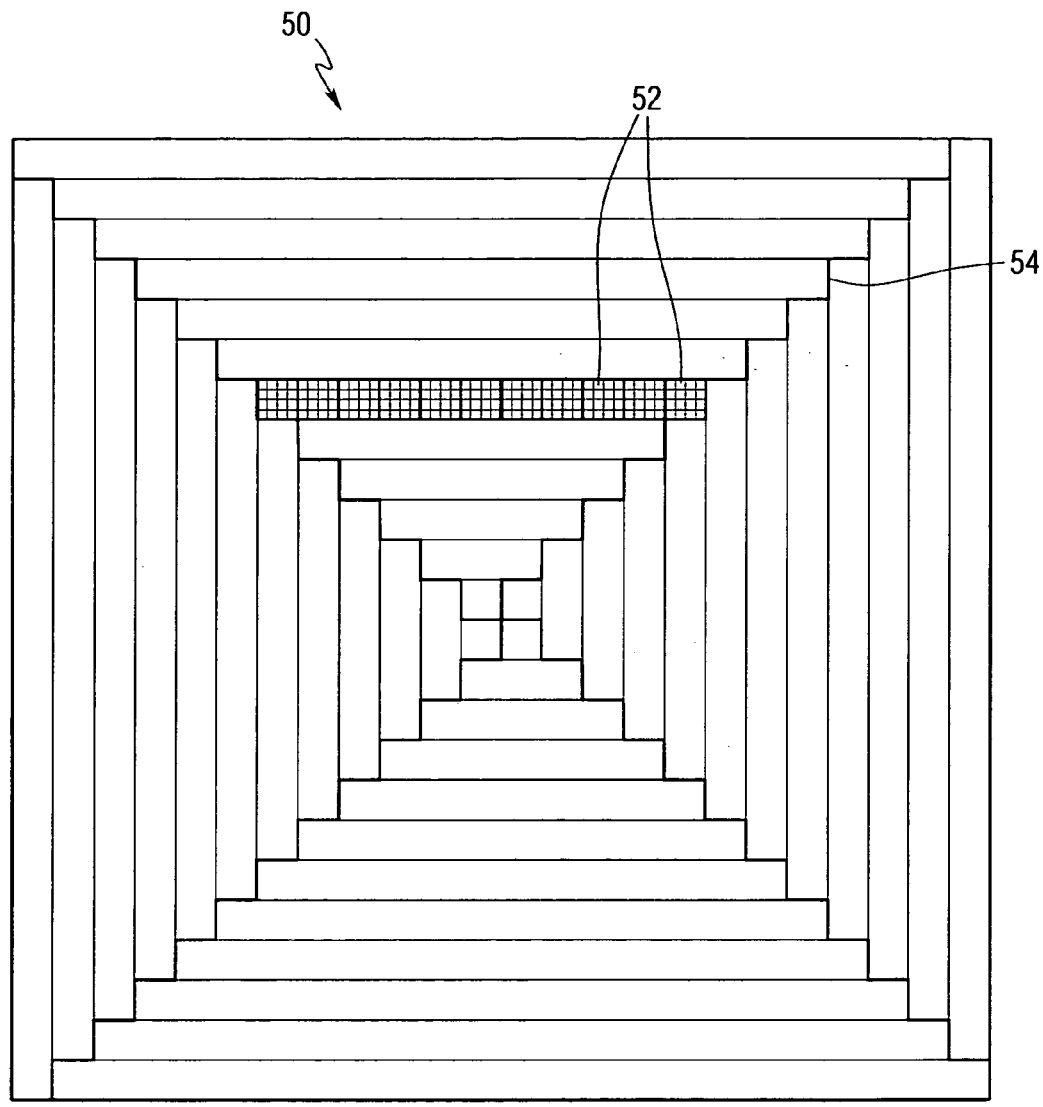
FIG. 6 is a partial equi-rectangular projection of the ortho-annular image of FIG. 5.

FIG. 6 shows that compression artifact sources such as the sharp line 46 in FIG. 5 may be eliminated by rearranging the pixel data of the ortho-annular projection 42. In one embodiment, the pixel data of the first data set representative of the ortho-annular projection 42 may be transformed into a second data set of pixel data representative of a partial equi-rectangular projection 50 so that compression artifact sources will occur only on the perimeters of macro-blocks of pixel data. As used herein, the term "partial equi-rectangular projection" refers to a rectangular array of pixels representing a portion of an equi-rectangular projection of the panoramic image. More specifically, the pixel data of the ortho-annular projection 42 may be divided into equi-rectangular blocks of pixels having a width substantially equal to a width of a macro-block of pixel data and a length substantially equal to an integer multiple of a length of a macro-block of pixel data. In this way, it will be ensured that a compression artifact source, such as the sharp line 46 of FIG. 5, will only occur on the perimeter of a macro-block of pixel data. The resulting partial equi-rectangular projection 50 is shown in FIG. 6. As shown in FIG. 6, pixels 52 have been arranged into blocks that are multiples of the size of a macro-block of pixel data, in this case corresponding to a macro-block of pixel data having a width w of 4 pixels and a length 1 of 4 pixels. The result is that the sharp lines of FIG. 5 dividing the ortho-annular projection 42 into the triangle shaped sectors have now assumed a "step" pattern, such as the sharp line 54 in FIG. 6, ensuring that the sharp lines will only fall between macro-blocks of pixel data, i.e., on the perimeter of a macro-block. This may substantially reduce or in some cases eliminate compression artifacts or distortions from appearing in the viewable image.

While the arrangement of the pixel data in the partial equi-rectangular projection 50 of FIG. 6 may help to eliminate compression artifacts, a complex algorithm could be required to locate pixels in the partial equi-rectangular projection in order to create a viewable image. The memory buffer that holds the pixel data is a linear buffer, with bits of pixel data stored in a serial fashion, or in one long "row". Therefore, the algorithm to locate pixel data in the partial equi-rectangular projection 50 and store the pixel data serially in a memory buffer may be complex, since the pixel data of the partial equi-rectangular projection is still divided into four sectors, and the pixels in each sector have a different rotation. This problem may be solved by rearranging the equi-rectangular blocks of FIG. 6 in a specific pattern which maintains the same rotation on all of the equi-rectangular blocks.

Figure 7A:
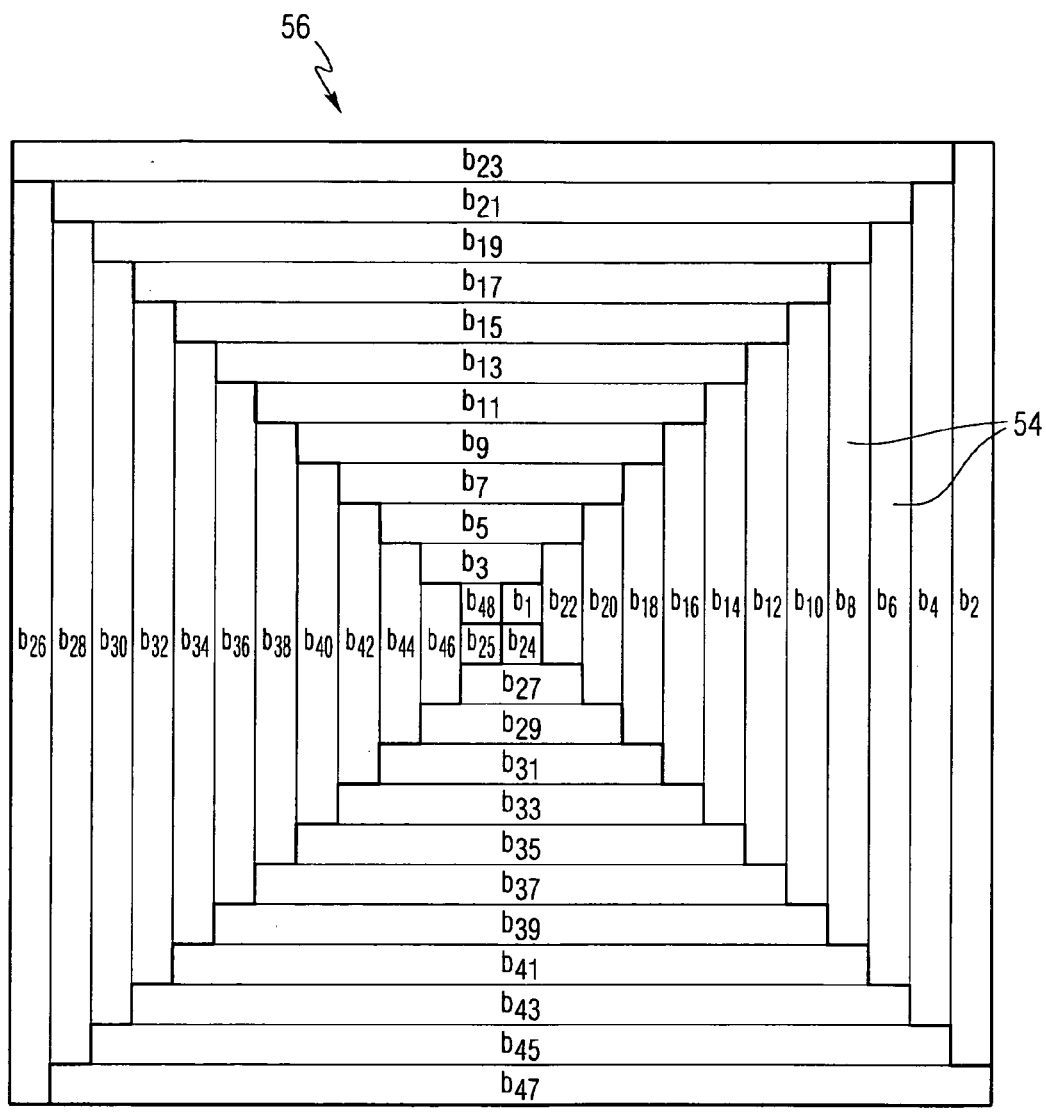
FIG. 7a is a partial equi-rectangular projection of an ortho-annular image in accordance with an embodiment of the present invention.
Figure 7B:
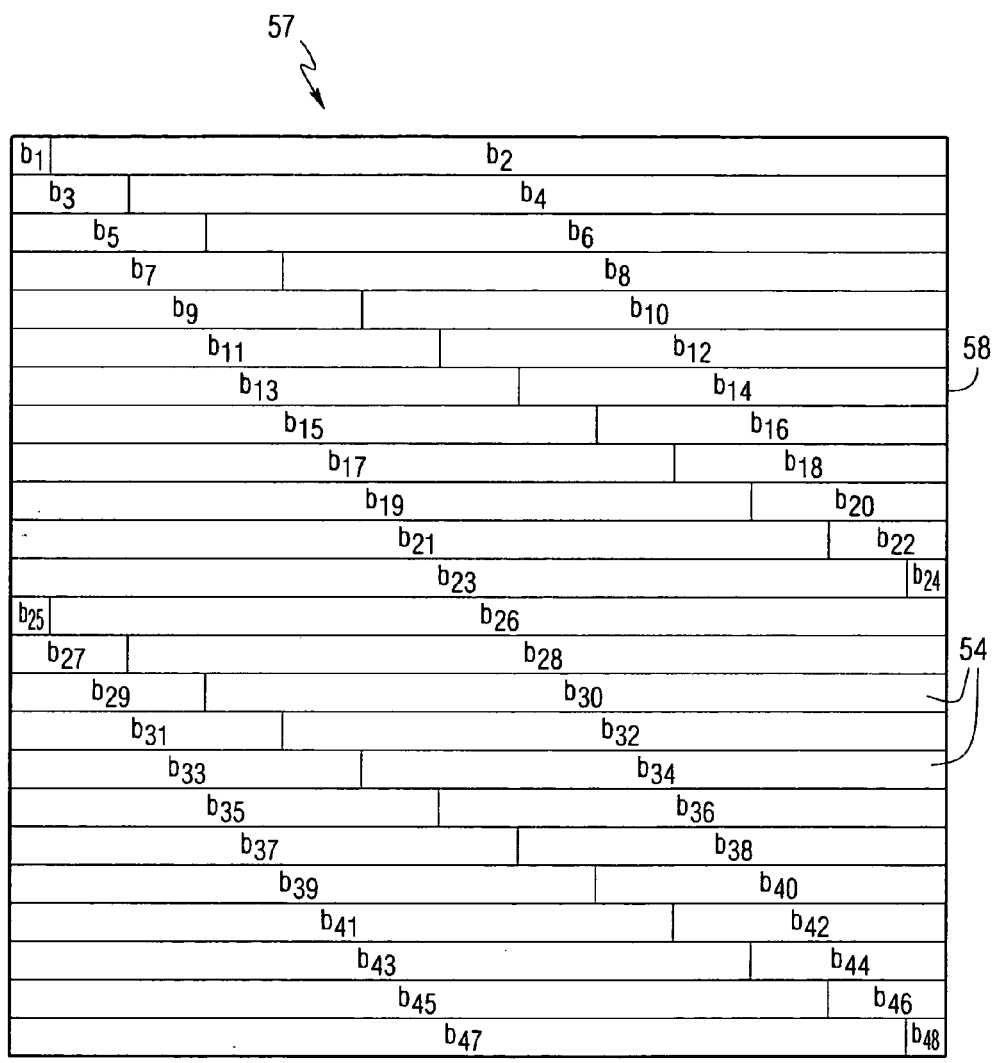
FIG. 7b illustrates the partial equi-rectangular projection of FIG. 7a arranged in an alternating sectors pattern.

FIGS. 7a and 7b illustrate one manner in which the equi-rectangular blocks of the partial equi-rectangular projection 50 may be arranged so that the pixel data may be conveniently accessed by a memory buffer. In one embodiment, the pixel data of the second data set representative of the partial equi-rectangular projection 50 may be transformed into a destination data set of pixel data representative of a modified partial equi-rectangular projection. As used herein, the term "modified partial equi-rectangular projection" refers to a partial equi-rectangular projection that has been arranged so that the pixel data may be more conveniently accessed by a memory buffer. As shown in FIG. 7a, the equi-rectangular blocks 54 of a partial equi-rectangular projection 56 may be identified as blocks $b_1$ through $b_{48}$, and the equi-rectangular blocks 54 may then be arranged in the pattern shown in FIG. 7b, creating a modified partial equi-rectangular projection 57. To obtain this pattern, equi-rectangular block $b_1$ of FIG. 7a is placed first, as shown in FIG. 7b. Equi-rectangular block $b_2$ is placed next as shown in FIG. 7b, then equi-rectangular block $b_3$, and so on. The equi-rectangular blocks 54 of FIG. 7a may continue to be placed in the order shown in FIG. 7b until the square frame 58 shown in FIG. 7b is substantially filled with the equi-rectangular blocks 54 from FIG. 7a. In this embodiment, such a resulting modified partial equi-rectangular projection 57 may be referred to as an alternating sectors pattern.

In one embodiment of the invention, a data table may be created containing pixel attribute data corresponding to the pixel data of the partial equi-rectangular projection 56 shown in FIG. 7a. As used herein, the term "pixel attribute data" refers to information that describes particular attributes of a piece of pixel data, i.e., a macro-block. Example macro-block attribute data may include, but is not limited to, the elevation angle φ representing the tilt angle of one edge of the partial equi-rectangular block, the elevation angle scaling factor $s_φ$ in degrees per pixel indicating how the tilt angle changes along an axis of the block, the rotation angle θ for the pan angle of another edge of the block, and the rotation angle scaling factor $s_θ$ in degrees per pixel to indicate the change in pan angle for each pixel along the other axis of the macro-block. Such pixel attribute data corresponding to each pixel in the partial equi-rectangular projection 56 shown in FIG. 7a may be stored in such a data table, and the data in the data table may be grouped and ordered corresponding to the equi-rectangular blocks 54 shown in FIG. 7a. In this manner, the macro-blocks of pixel data making up each equi-rectangular block 54 may be easily grouped together so that the partial equi-rectangular projection 56 shown in FIG. 7a may be easily recreated from the alternating sectors arrangement of pixel data shown in FIG. 7b, and vice versa. This data table may be stored in a destination image file, along with the pixel data of the destination data set, so that the partial equi-rectangular projection of FIG. 7a may be readily reproduced once the photographic image data has been transmitted to a destination for processing into a viewable image. Alternately, a well-known data table for a transmission can be generated by the destination processor and applied to incoming image data.

Figure 9A:
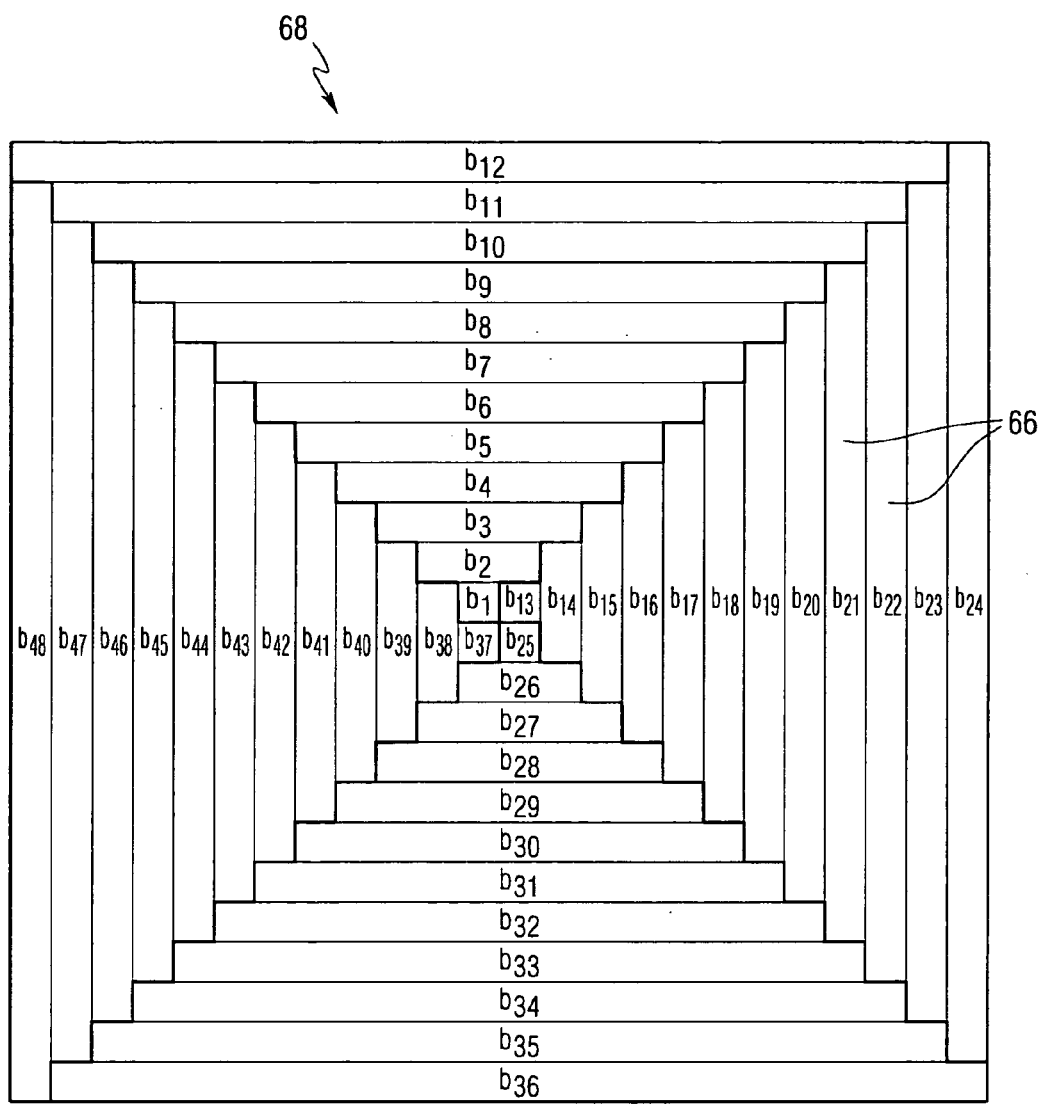
FIG. 9a is a partial equi-rectangular projection of an ortho-annular image in accordance with another embodiment of the present invention.
Figure 9B:
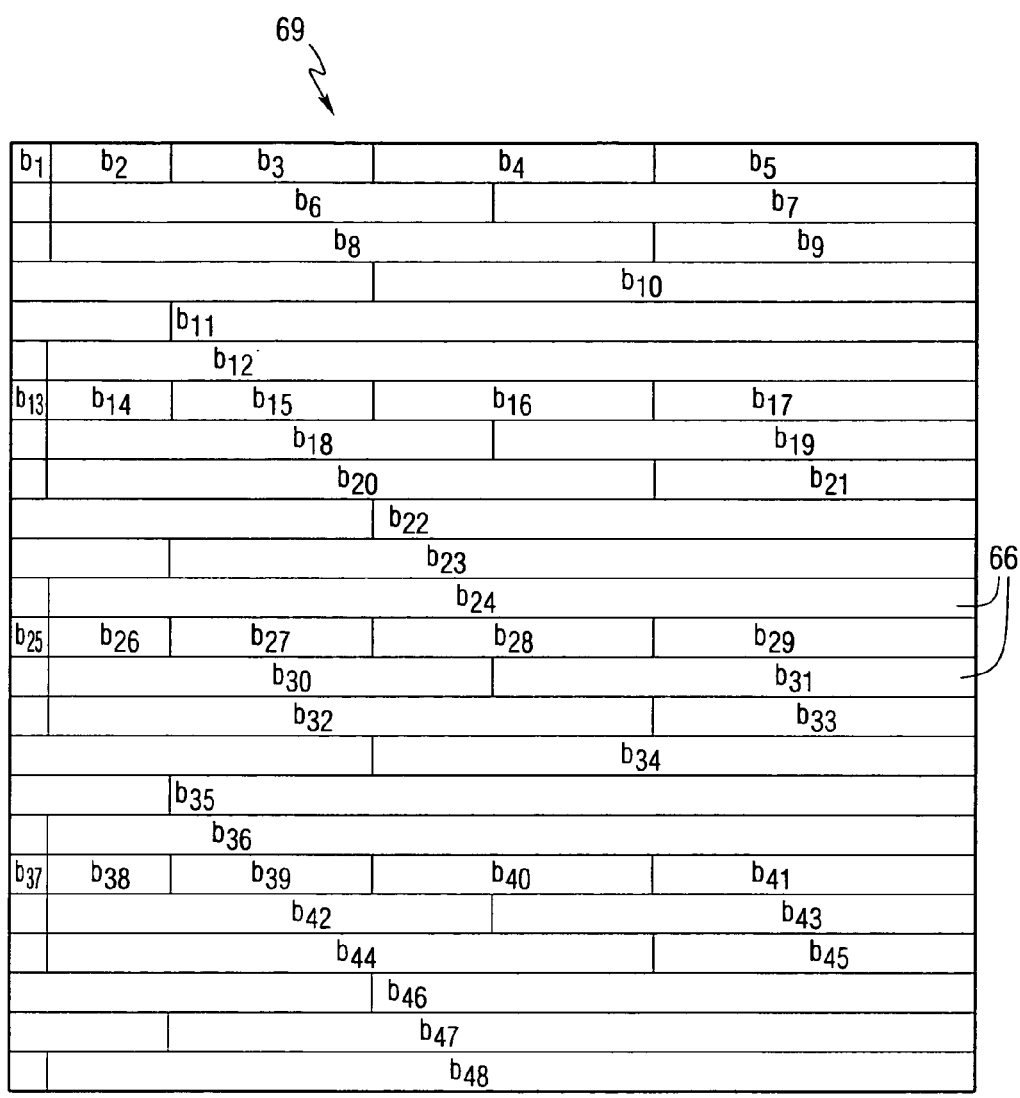
FIG. 9b illustrates the partial equi-rectangular projection of FIG. 9a arranged in a four sectors phi major pattern.

FIGS. 9a and 9b illustrate a preferred embodiment, wherein the equi-rectangular blocks 66 of the partial equi-rectangular projection 68 shown in FIG. 9a are arranged in modified partial equi-rectangular projection 69 having a four sectors phi major pattern as illustrated in FIG. 9b. As used herein, the term "phi major pattern" means blocks from each quadrant are ordered first by their phi (tilt) axis, then by their theta (pan) axis. The four sectors phi major pattern shown in FIG. 9b may be used because this pattern provides improved memory locality, i.e., improved sequential data access, which can increase the speed and performance of the encoding process described herein. The alternating sectors pattern provides optimum memory locality because pixels for each quadrant of the original annular image are grouped together, providing optimal memory locality when producing a perspective view of the panoramic image.

Figure 8A:
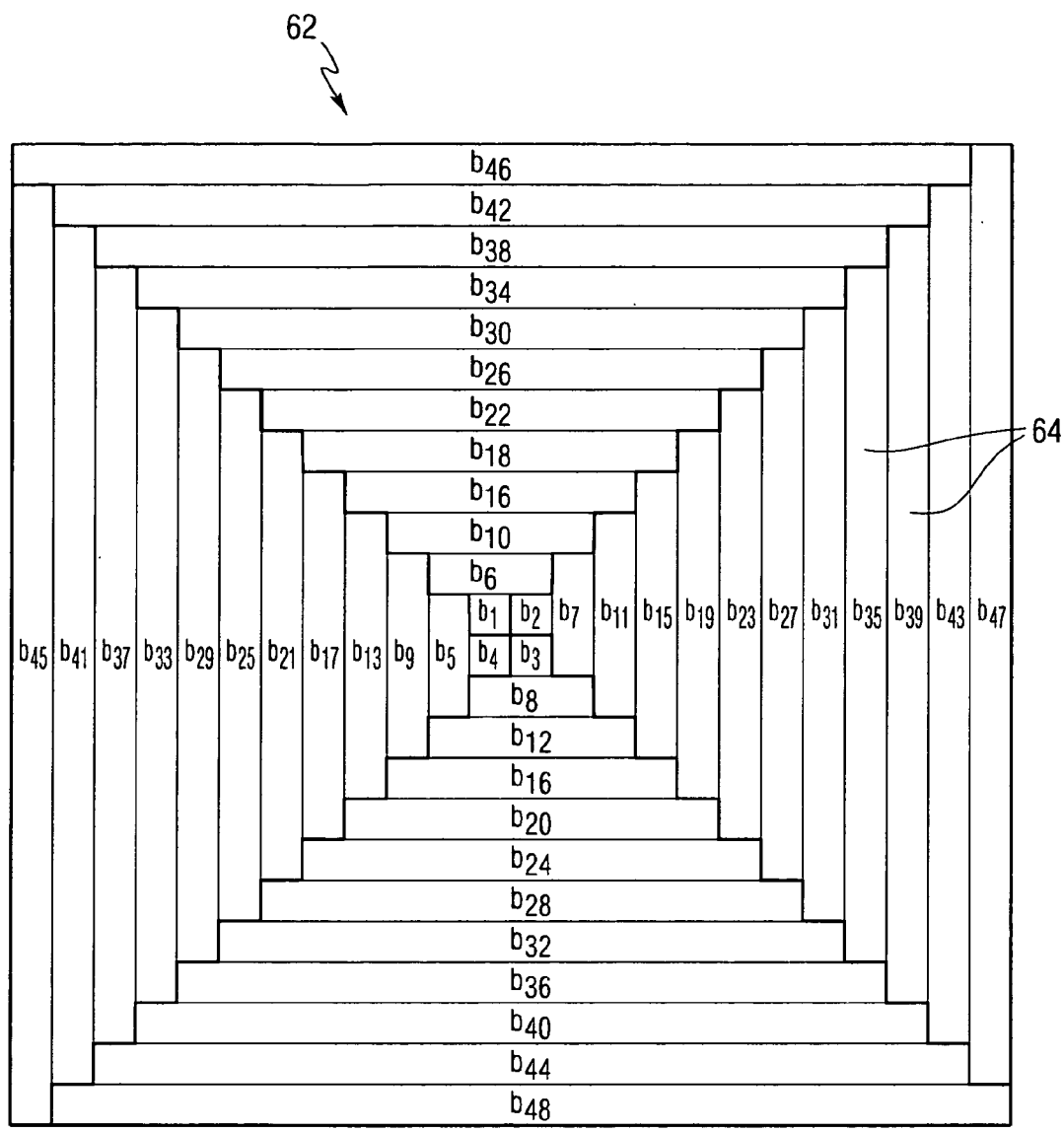
FIG. 8a is a partial equi-rectangular projection of an ortho-annular image in accordance with another embodiment of the present invention.
Figure 8B:
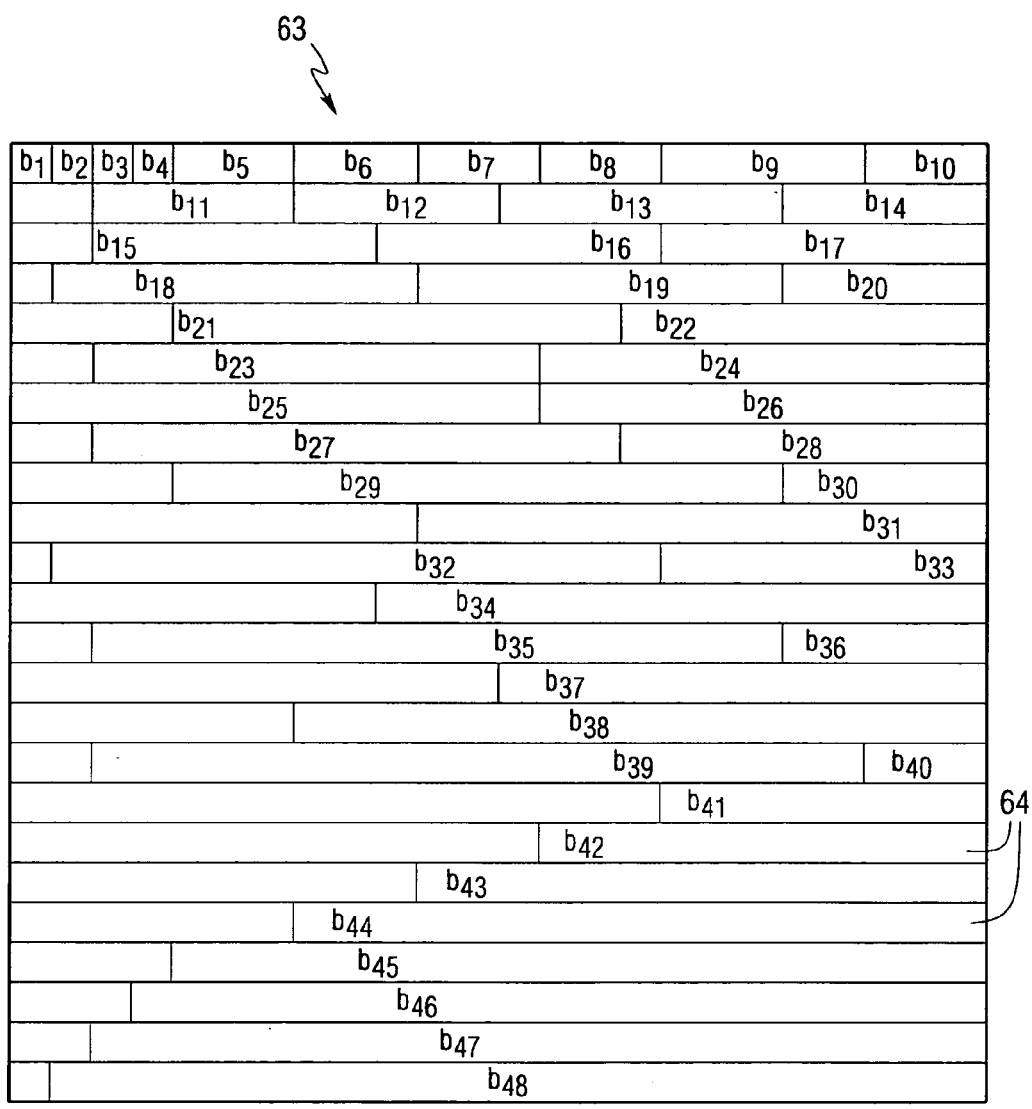
FIG. 8b illustrates the partial equi-rectangular projection of FIG. 8a arranged in a linear increasing phi major pattern.

However, other modified partial equi-rectangular projections containing patterns of arranged equi-rectangular blocks may be used. In one embodiment, a linear increasing phi major pattern may be used. As used herein, the term "linear increasing phi major pattern" refers to the ordering of macro-blocks first by their minimum phi angle as stored in the data table representation. In another embodiment, the alternating sectors pattern shown in FIG. 7b may be used because this pattern provides improved memory locality, i.e., improved sequential data access, which can increase the speed and performance of the encoding process described herein. FIG. 8a shows a partial equi-rectangular projection 62 of pixel data divided into equi-rectangular blocks 64, and FIG. 8b shows the equi-rectangular blocks 64 of the partial equi-rectangular projection 62 arranged in a modified partial equi-rectangular projection 63 having a linear increasing phi major pattern. The equi-rectangular blocks 64 may be numbered as shown in FIG. 8*a* and then arranged in the order shown in FIG. 8*b* to create the modified partial equi-rectangular projection 63. In another embodiment, the equi-rectangular blocks of a partial equi-rectangular projection may be arranged in a modified partial equi-rectangular projection having a purely random pattern. This may be used as a form of encryption, as the receiver of the random patterned projection would need to have the corresponding data table so that the equi-rectangular blocks may be placed back in a partial equi-rectangular projection in the proper order."

In order to create a viewable panoramic image from raw panoramic image data, such as the raw panoramic image of FIG. 2, it is often times necessary to retrieve pixel data from the raw panoramic image using an interpolation scheme, as is well known in the art. Many times, an interpolator may require pixel data from outside the image boundary. Therefore, as an optional part of the encoding process, border pixel data may be added to the source image file. This border pixel data may include a redundant row of pixels that could be placed along the edges of the image boundary. Software may be used to introduce the border pixel data, or the border pixel data may be added with graphics hardware.

Once the equi-rectangular blocks of pixels have been arranged in one of the patterns described above as a destination data set, or in any other suitable modified partial equi-rectangular projection that facilitates efficient data access, the pixel data will be encoded in a manner such that transmission bandwidth may be fully utilized by actual image data, compression artifact sources may be rendered harmless to the image, and the image data may be quickly and conveniently accessed by memory buffers and/or other computer storage means. Such a destination data set of pixel data may then be outputted as a destination image file and may be transmitted to a destination for processing, such as converting the destination image file into a viewable image.

Figure 10:
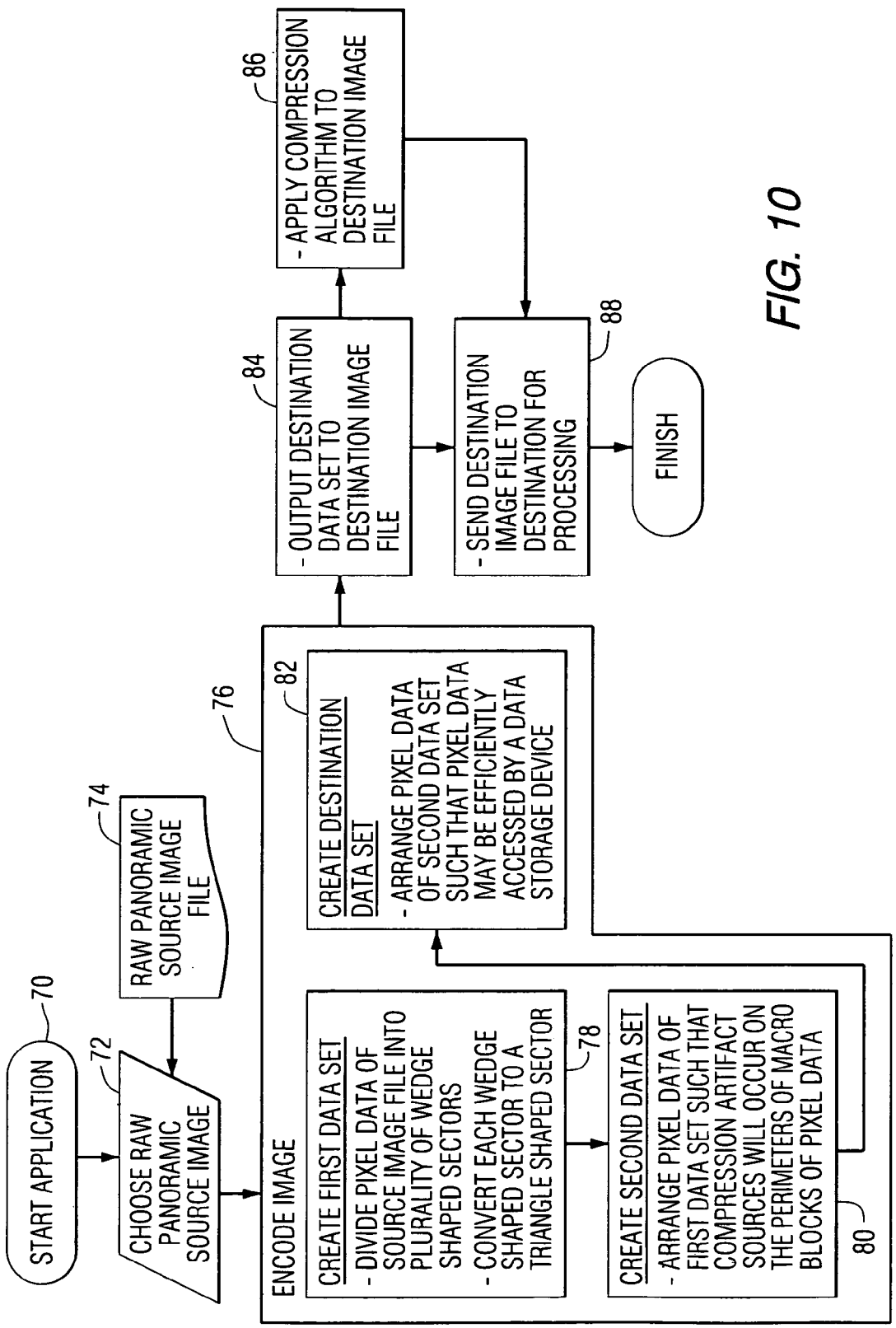
FIG. 10 is a flow diagram illustrating a particular example of the method of the invention.

FIG. 10 is a flow diagram that illustrates a particular example of the method of the invention. At the start of the process, as illustrated in block 70, a raw panoramic source image is chosen as shown in block 72 from a raw panoramic source image file 74. In one embodiment, the raw panoramic source image file may be an annular source image file, and an annular source image may be chosen from the annular source image file. Several processes may then be performed to encode the image as shown in block 76. Block 78 shows that the method of the invention may transform pixel data from the source image file into a first data set representative of an ortho-annular projection. In particular, block 78 shows that the pixel data of the source image file can be divided into a plurality of wedge shaped sectors. Each of the wedge shaped sectors can be converted into a triangle shaped sector.

Next, block 80 shows that the pixel data from the first data set representing an ortho-annular projection can be transformed into a second data set of pixel data representing a partial equi-rectangular projection. More specifically, block 80 shows that the pixel data of the first data set can be arranged such that any compression artifact sources present will only occur on the perimeters of macro-blocks of pixel data.

Next, block 82 shows that the pixel data from the second data set representing a partial equi-rectangular projection can be transformed into a destination data set of pixel data representing a modified partial equi-rectangular projection. More specifically, block 82 shows that the pixel data of the second data set can be arranged such that the pixel data may be efficiently accessed in a data storage device, such as a memory buffer.

Block 84 shows that the encoded pixel data of the destination data set may be outputted to a destination image file, which then may be sent to a destination for processing as shown in block 88.

As an optional step, block 86 shows that the destination image file may be compressed using a compression algorithm before the destination image file is sent to a destination.

Using the described process, the panoramic source image may be converted into a destination image file in a form that may be more efficiently delivered to a destination and/or stored on a destination computer or processor, while maintaining the quality of the original source image.

The described process can be implemented using a hardware graphics accelerated platform. This platform makes use of dedicated high-performance graphics accelerator chips (e.g. the nVidia "GeForce" graphics card) to perform the algorithm described. The accelerator chip provides the means to perform the transformations described herein without taxing the main CPU of the hardware. When using an accelerated hardware platform, larger macro-block sizes are preferred because the hardware is designed to work fastest with larger chunks of memory.

The described process may also be implemented as a software process on a non-accelerated computing platform. This is desirable for low-cost, multi-purpose computing systems where dedicated hardware is cost prohibitive. In this instance, the processor will perform better with smaller macro-blocks that fit entirely within the cache architecture of the processor for maximum memory throughput. The data lookup table for decoding the image will help to minimize the amount of memory that needs to be accessed in order to produce a standard view of the image. This will reduce the overall requirement for memory throughput since the entire image must not be processed.

Although the method and apparatus of the present invention has been primarily described as being utilized for encoding panoramic photographic images, it is to be understood that the method and apparatus described herein may also be utilized for encoding other types of photographic images that would benefit from the encoding process described, and such a utilization is within the scope of the present invention.

The method and apparatus of the present invention may be used to encode a single photographic image, and/or a plurality of photographic images which when combined together may make up a video feed.

Whereas particular embodiments of this invention have been described above for purposes of illustration, it will be evident to those skilled in the art that numerous variations of the details of the present invention may be made without departing from the invention as defined in the appended claims.

The invention claimed is:

1. A method of encoding images, the method comprising the steps of:
   retrieving a source image file including pixel data;
   transforming the source image file pixel data into a destination data set of pixel data representative of a modified partial equi-rectangular projection, wherein transforming the source image file pixel data comprises the steps of transforming the source image file pixel data into a first data set of pixel data representative of an ortho-annular projection, and transforming the pixel data from the first data set into a second data set of pixel data representative of the modified partial equi-rectangular projection; and outputting the pixel data from the destination data set as a destination image file.

2. A method according to claim 1, wherein the source image file comprises an annular source image file.

3. A method according to claim 1, wherein the step of transforming the source image file pixel data into a destination data set of pixel data comprises the step of:

arranging the destination data set of pixel data such that a compression artifact source will occur on a perimeter of at least one macro-block of pixel data.

4. A method according to claim 3, wherein the step of arranging the destination data set of pixel data includes the step of dividing the source image file pixel data into equi-rectangular blocks of pixels having a width substantially equal to a width of the at least one macro-block of pixel data and a length substantially equal to an integer multiple of a length of the at least one macro-block of pixel data.

5. A method according to claim 1, wherein the step of transforming the source image file pixel data into the destination data set of pixel data comprises the step of:

arranging the destination data set of pixel data into a form that may be accessed by a data storage device.

6. A method according to claim 5, wherein the destination data set of pixel data is arranged to include equi-rectangular blocks of pixels having a width substantially equal to a width of a macro-block of pixel data and a length substantially equal to an integer multiple of a length of a macro-block of pixel data.

7. A method according to claim 5, wherein the destination data set of pixel data is arranged in one of: a four sectors phi major pattern, a linear increasing phi major pattern, an alternating sectors pattern, and a random pattern.

8. A method according to claim 1, further comprising the steps of:

creating a data table containing pixel attribute data corresponding to source image pixel data; and storing the data table with the destination data set of pixel data as the destination image file.

9. A method according to claim 1, wherein the source image file comprises an annular source image file, and wherein the step of transforming the source image file pixel data into the first data set of pixel data campuses the steps of:

dividing the pixel data of the annular source image file into a plurality of wedge shaped sectors; and converting each wedge shaped sector to a triangle shaped sector.

10. A method according to claim 9, wherein the pixel data of the annular source image file is further divided into a plurality of substantially concentric bands each having a width substantially equal to a width of a macro-block of pixel data.

11. A method according to claim 9, wherein each wedge shaped sector is converted to a triangle shaped sector by transforming an arced side of the wedge shaped sector into a substantially straight line segment.

12. A method according to claim 11, wherein the length of the arced side is substantially equal to the length of the line segment.

13. A method according to claim 1, wherein the ortho-annular projection is substantially in the shape of one of: a square or a rectangle.

14. A method according to claim 1, further comprising the step of adding border pixel data to the source image file.

15. An apparatus for encoding images, the apparatus comprising:

means for receiving a source image file including pixel data; and a processor for transforming the source image file pixel data into a destination data set of pixel data representative of a modified partial equi-rectangular projection, and outputting the pixel data from the destination data set as a destination image file, wherein the processor further serves as means for transforming the source image file pixel data into a first data set of pixel data representative of an ortho-annular projection, transforming the pixel data from the first data set into a second data set of pixel data representative of the partial equi-rectangular projection.

16. An apparatus according to claim 15, wherein the source image file is an annular source image file.

17. An apparatus according to claim 15, wherein the processor further serves as means for:

arranging the source image file pixel data such that a compression artifact source will occur on a perimeter of at least one macro-block of pixel data.

18. An apparatus according to claim 17, wherein the processor further serves as a means for dividing the source image file pixel data into equi-rectangular blocks of pixels having a width substantially equal to a width of the at least one macro-block of pixel data and a length substantially equal to an integer multiple of a length of the at least one macro-block of pixel data.

19. An apparatus according to claim 15, wherein the processor further serves as means for:

arranging the destination data set of pixel data such that the destination data set of pixel data may be accessed in a data storage device.

20. An apparatus according to claim 19, wherein the destination data set of pixel data is arranged to include equi-rectangular blocks of pixels having a width substantially equal to a width of a macro-block of pixel data and a length substantially equal to an integer multiple of a length of a macro-block of pixel data.

21. An apparatus according to claim 19, wherein the destination data set of pixel data is arranged in one of: a four sectors phi major pattern, a linear increasing phi major pattern, an alternating sectors pattern, or a random pattern.

22. An apparatus according to claim 15, wherein the processor further serves as means for:

dividing the source image file pixel data into a plurality of wedge shaped sectors; and converting each wedge shaped sector to a triangle shaped sector.

23. An apparatus according to claim 22, wherein the source image file pixel data is further divided into a plurality of substantially concentric bands each having a width substantially equal to a width of a macro-block of pixel data.

24. An apparatus according to claim 22, wherein each wedge shaped sector is converted to a triangle shaped sector by transforming an arced side of the wedge shaped sector into a substantially straight line segment.

25. An apparatus according to claim 24, wherein the length of the arced side is substantially equal to the length of the line segment.

26. An apparatus according to claim 15, wherein the processor further serves as means for:

creating a data table containing pixel attribute data corresponding to the source image file pixel data and storing the data table in the destination image file.

27. An apparatus according to claim 15, wherein the ortho-annular projection is in the shape of one of: a square or a rectangle.

28. An apparatus according to claim 15, wherein the source image file includes border pixel data.

29. An apparatus for encoding images, the apparatus comprising:
   means for receiving a source image file including pixel data; and
   a processor for transforming the source image file pixel data into a destination data set of pixel data representative of a modified partial equi-rectangular projection, and outputting the pixel data from the destination data set as a destination image file, wherein the processor further serves as means for:
   dividing the source image file pixel data into a plurality of wedge shaped sectors; and
   converting each wedge shaped sector to a triangle shaped sector.

* * * * *

UNITED STATES PATENT AND TRADEMARK OFFICE
CERTIFICATE OF CORRECTION

PATENT NO. : 7,139,440 B2 Page 1 of 1
APPLICATION NO. : 10/227136
DATED : November 21, 2006
INVENTOR(S) : Michael Rondinelli and Herman Herman It is certified that error appears in the above-identified patent and that said Letters Patent is hereby corrected as shown below:

Column 1, Line 45
Add period between "HDTV" and "Current"

Column 11, Line 45 (Claim 9)
"set of pixel data campuses" should read -- set of pixel data comprises --

Signed and Sealed this

Tenth Day of April, 2007

JON W. DUDAS
*Director of the United States Patent and Trademark Office*